S. S. GAILLARD.
ROTARY VALVE FOR GASOLENE ENGINES OR GAS ENGINES.
APPLICATION FILED DEC. 29, 1915.

1,197,475.

Patented Sept. 5, 1916.

Witness
L. B. James

Inventor
Samuel S. Gaillard
by
Victor H. Wallace
Attorney

UNITED STATES PATENT OFFICE.

SAMUEL S. GAILLARD, OF PERDUE HILL, ALABAMA.

ROTARY VALVE FOR GASOLENE-ENGINES OR GAS-ENGINES.

1,197,475.

Specification of Letters Patent.

Patented Sept. 5, 1916.

Application filed December 29, 1915. Serial No. 89,168.

*To all whom it may concern:*

Be it known that I, SAMUEL S. GAILLARD, a citizen of the United States, residing at Perdue Hill, in the county of Monroe, State of Alabama, have invented certain new and useful Improvements in Rotary Valves for Gasolene-Engines or Gas-Engines; and I do hereby declare the following to be a full, clear, and exact description, such as will enable others skilled in the art to which it appertains to make and use the same.

The present invention is directed to improvements in rotary valves for gas engines, and has for its object to so construct a device of this character that the crank shaft of the engine, when rotating, will control the rotation of the valve.

A further object of the invention is to provide a valve of this type which is exceedingly simple in construction, and one which, when rotating, will control the inlet and exhaust ports of the engine cylinders.

A still further object of the invention is to provide a valve particularly adapted for use in connection with a plurality of engine cylinders.

A still further object of the invention is to provide a valve which will be noiseless in operation, and one in which the parts are reduced to a minimum.

Figure 1:
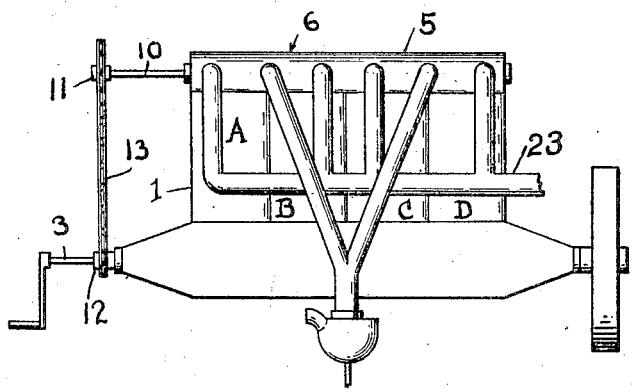
Figure 2:
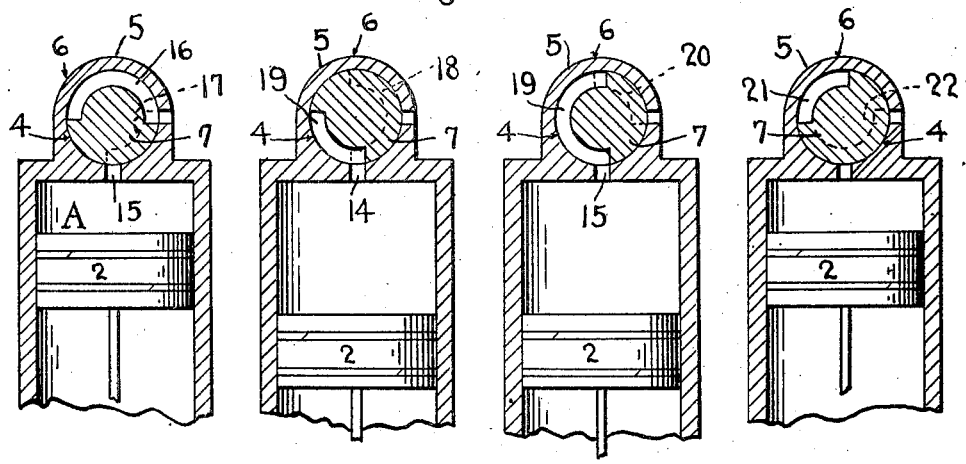
Figure 3:
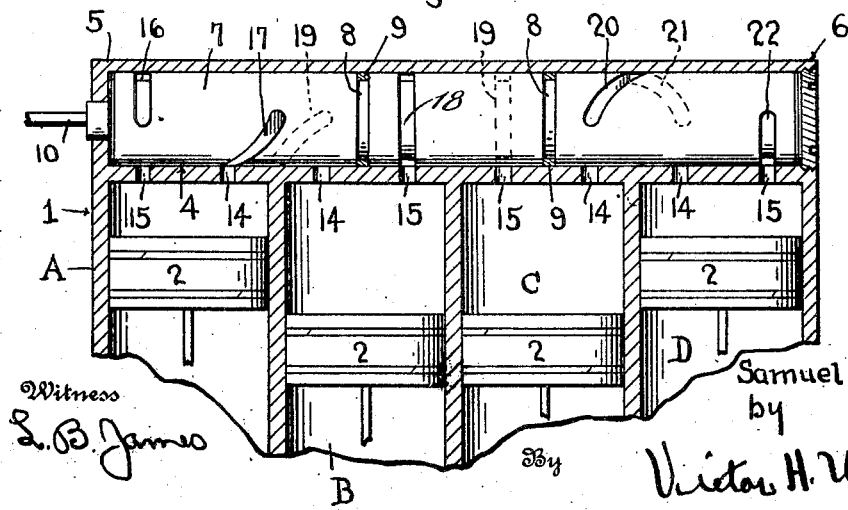

With these and other objects in view, this invention resides in the novel features of construction, formation, combination and arrangement of parts to be hereinafter more fully described, claimed and illustrated in the accompanying drawings, in which:

Figure 1 is a side elevation of a four cylinder engine equipped with the valve. Fig. 2 is a transverse sectional view through the cylinders, showing the relation of the valve to each cylinder. Fig. 3 is a longitudinal sectional view through the valve casing, the valve being shown in elevation.

Referring to the drawings, 1 indicates the engine, and in this instance being of the four cylinder type, and in which are operable the reciprocating cylinders 2 which are connected to the crank shaft 3, in the usual manner. Formed upon the tops of the cylinders is a semi-circular seat 4, which has associated therewith a cover 5, said cover being bolted to the seat and forming in conjunction therewith a casing 6 in which is rotatably mounted a cylindrical valve 7. The valve is provided with annular grooves 8, which are engaged by the semi-annular ribs 9 formed in the seat 5, said ribs serving to prevent longitudinal movement of the valve in the casing, but permitting the same to rotate therein.

One end of the valve 7 is provided with an extension 10, which projects through the adjacent end of the casing, and has fixed thereto a sprocket wheel 11, which is alined with the similar wheel 12 fixed to the shaft 3. Trained around these sprockets is a chain 13, whereby rotary movement is imparted to the valve when the shaft is rotating.

The heads of the cylinders A, B, C and D are each provided with inlet and exhaust ports 14 and 15, respectively. The valve cylinder 7 is provided with a semi-annular groove 16, and a diagonally disposed semi-annular groove 17, which are adapted to coöperate with the ports 14 and 15 of the cylinder A. Similarly arranged grooves 18 and 19 coöperate with the ports 14 and 15 of the cylinder B, while coöperating with the cylinders C and D are grooves 19 and 20, and 21 and 22, respectively.

Thus it will be seen that when the piston 2 in cylinder A is on its suction stroke the groove 17 permits the charge to enter the cylinder, while the groove 18 is in communication with the cylinder B, which permits the exhaust to escape to the exhaust manifold 23. The piston in cylinder C is now compressing the charge, while the cylinder B is firing. The operation of the valve is the same in respect to each cylinder, or in other words the rotation of the valve cylinder is timed so that when one of the diagonal grooves is permitting the charge to enter the respective cylinder, the semi-annular groove will register with its respective port in time to permit the exhaust to escape. It will be of course understood that any suitable form of exhaust manifold can be used, and that the gas supply pipes will be so arranged as to communicate with the diagonal grooves of the respective cylinders. By removably mounting the cover 5, it is obvious that access can be had to the valve cylinder, when desired.

What I claim is:

In combination with a multi-cylinder gas engine, of a casing common to all of the cylinders, a valve cylinder rotatably mounted in the casing, each cylinder having an intake and an exhaust port communicating with the casing, said valve cylinder having semi-annular grooves, and semi-annular diagonally disposed grooves adapted to alternately register with the ports of the respective cylinders, and means for rotating the valve.

In testimony whereof, I affix my signature, in the presence of two witnesses.

SAMUEL S. GAILLARD.

Witnesses:
A. K. AGEE,
JANIE AGEE